United States Patent
Damaska et al.

(10) Patent No.: US 11,518,617 B2
(45) Date of Patent: Dec. 6, 2022

(54) DRIVE ROLLER ASSEMBLY FOR A CONVEYOR SYSTEM AND CONVEYOR SYSTEM COMPRISING THE SAME

(71) Applicant: Mettler-Toledo Safeline Ltd., Manchester (GB)

(72) Inventors: Dirk Damaska, Lutz, FL (US); Eric Schamell, Lutz, FL (US); Wanchuan Hu, Shanghai (CN); Sun Xu, Changzhou (CN); Steve Howard, Manchester (GB)

(73) Assignee: METTLER-TOLEDO SAFELINE LTD., Manchester (GB)

( * ) Notice: Subject to any disclaimer, the term of this patent is extended or adjusted under 35 U.S.C. 154(b) by 91 days.

(21) Appl. No.: 16/851,438

(22) Filed: Apr. 17, 2020

(65) Prior Publication Data
US 2020/0331700 A1    Oct. 22, 2020
US 2021/0300684 A9    Sep. 30, 2021

(30) Foreign Application Priority Data

Apr. 17, 2019    (CN) .......................... 201910309510.X

(51) Int. Cl.
*B65G 39/12*      (2006.01)
*B65G 13/06*      (2006.01)
(Continued)

(52) U.S. Cl.
CPC .............. *B65G 13/06* (2013.01); *B65G 13/11* (2013.01); *B65G 39/12* (2013.01); *B65G 39/20* (2013.01); *B65G 2811/09* (2013.01)

(58) Field of Classification Search
CPC ...... B65G 13/06; B65G 13/065; B65G 13/07; B65G 13/073; B65G 23/24; B65G 39/10;
(Continued)

(56) References Cited

U.S. PATENT DOCUMENTS 1,777,921 A * 10/1930   Hudson .................... F27D 3/026
                                                           414/159
3,582,116 A * 6/1971   Young ...................... E03C 1/042
                                                           403/359.1
(Continued)

FOREIGN PATENT DOCUMENTS

| CN | 203794146 U | 8/2014 |
|---|---|---|
| CN | 104670837 A | 6/2015 |

(Continued)

OTHER PUBLICATIONS

The extended European Search Report dated Sep. 17, 2020, by the European Patent Office in corresponding European Application No. 20164787.2. (8 pages).

*Primary Examiner* — Joseph A Dillon, Jr.
(74) *Attorney, Agent, or Firm* — Buchanan Ingersoll & Rooney PC

(57) ABSTRACT

A drive roller assembly for a conveyor system includes a drive roller having a longitudinal axis, the drive roller having a roller body and a shaft. A support structure rotatably supports a second axial end portion of the shaft and a drive for rotatably driving the drive roller. A first axial end portion of the shaft and the drive are rotatably coupled in an axially engaged condition in which the drive roller is in rotatable engagement with the drive and in which the drive is axially releasable. The support is configured and adapted to be detachably attached to an attachment portion of the support structure to maintain the drive roller rotatably supported when attached and to allow the drive roller to be removed from the support structure when detached.

9 Claims, 5 Drawing Sheets

(51) Int. Cl.
*B65G 13/11* (2006.01)
*B65G 39/20* (2006.01)

(58) Field of Classification Search
CPC .............. B65G 39/12; B65G 2811/09; Y10T 403/1683
USPC .................... 198/788, 789, 791, 835; 403/21
See application file for complete search history.

(56) References Cited

U.S. PATENT DOCUMENTS

| | | | |
|---|---|---|---|
| 4,131,420 A | 12/1978 | Miller | |
| 4,366,899 A * | 1/1983 | Doro | B65G 13/07 198/781.04 |
| 4,693,462 A * | 9/1987 | Pollich | B65H 29/686 271/183 |
| 5,088,596 A * | 2/1992 | Agnoff | B65G 13/073 198/788 |
| 5,287,977 A * | 2/1994 | Tirschler | B65G 13/07 198/789 |
| 5,297,670 A * | 3/1994 | Yamaguchi | F16D 1/104 198/789 |
| 5,562,199 A * | 10/1996 | Fisher | B65G 23/12 198/831 |
| 5,749,454 A * | 5/1998 | Layne | B65G 13/00 198/464.4 |
| 6,509,533 B1 | 1/2003 | Tanaka et al. | |
| 6,523,775 B2 * | 2/2003 | Fan | B65G 23/00 198/804 |
| 7,413,436 B2 * | 8/2008 | Wuenning | B65G 13/06 219/469 |
| 8,903,277 B2 * | 12/2014 | Ishida | G03G 21/1647 399/167 |
| 9,586,763 B2 * | 3/2017 | Reischl | B65G 23/08 |
| 9,776,806 B2 * | 10/2017 | Reischl | B65G 39/12 |
| 10,017,325 B2 * | 7/2018 | Ramezani | B65G 39/12 |
| 10,239,696 B1 * | 3/2019 | Brouk | B65G 15/60 |
| 10,669,775 B2 * | 6/2020 | Cole | E06B 9/171 |
| 11,091,321 B2 * | 8/2021 | Dorok | H02K 7/1012 |
| 2004/0144623 A1 * | 7/2004 | Newsom | B65G 47/261 198/788 |
| 2013/0344969 A1 | 12/2013 | Erb et al. | |
| 2014/0175938 A1 * | 6/2014 | Mignano | H02K 5/24 310/216.113 |
| 2018/0319595 A1 * | 11/2018 | Ramezani | B65G 13/07 |
| 2020/0346868 A1 * | 11/2020 | K.S | B65G 13/11 |

FOREIGN PATENT DOCUMENTS

| | | |
|---|---|---|
| CN | 106081543 A | 11/2016 |
| EP | 2492219 A1 | 8/2012 |
| EP | 2716580 A1 | 4/2014 |
| KR | 100685655 B1 | 2/2007 |

\* cited by examiner

DRIVE ROLLER ASSEMBLY FOR A CONVEYOR SYSTEM AND CONVEYOR SYSTEM COMPRISING THE SAME

RELATED APPLICATION

This application claims priority under 35 U.S.C. § 119 to Chinese Patent Application No. 20190309510.X filed in China on Apr. 17, 2019, the entire content of which is hereby incorporated by reference in its entirety.

FIELD

The present disclosure relates to a drive roller assembly for a conveyor system, the assembly having a drive roller with a longitudinal axis, the drive roller including a roller body and a shaft, the shaft having first and second axial end portions, the drive roller being rotatable around the longitudinal axis, a support structure for rotatably supporting the drive roller, the support structure including a support for rotatably supporting the second axial end portion of the shaft, and a drive for rotatably driving the drive roller, and to a conveyor system which includes such a drive roller assembly.

BACKGROUND INFORMATION

Conveyor systems are used in various industries to move objects from one location to another one. These systems can include different types of rollers, for example infeed or outfeed rollers, tension rollers, tracking rollers and drive rollers. On occasion it might be necessary to remove one or several of the rollers for cleaning, maintenance or replacement.

In the case that the conveyor system is a belt conveyor system, a conveyor belt is wound around a drive roller. The drive roller engages with the belt. Thereby, a rotational movement of the drive roller leads to a movement of the belt in the conveying direction. After some use, the conveyor belt must be removed from the conveyor system for cleaning, maintenance or replacement. The removal of the belt requires at least the removal of the drive roller. However, this removal is complicated since the belt is wound around the drive roller, as explained.

In view thereof, several ideas have been implemented to facilitate the removal of a specific roller from a conveyor system.

An example is given in CN 20 37 941 46 U, the disclosure of which is hereby incorporated by reference in its entirety, and which discloses a conveyor belt system wherein a brush roller that is used for cleaning a conveyor belt of the system is provided with a quick release mechanism. In the case of the drive roller, it is, however, difficult to implement a quick release mechanism as the drive roller is normally connected to the drive means, for example a motor.

In U.S. Pat. No. 6,509,533 B1, the disclosure of which is hereby incorporated by reference in its entirety, a system is disclosed wherein a rotary coupling between a motor and a drive roller can be released by moving the motor away from the drive roller. Then, a carry unit of the conveyor belt system having the drive roller can be detached by moving it in the upper direction. However, the movement of the motor away from the drive roller requires a complicated configuration.

U.S. Pat. No. 4,131,420, the disclosure of which is hereby incorporated by reference in its entirety, discloses a two-piece quick connect-disconnect coupling which connects a conveyor roller to a drive train, wherein a coupling section of the drive train is detachably connected to the conveyor roller by a retaining screw. However, both the configuration of the system and its handling are complicated.

BRIEF DESCRIPTION OF THE DRAWINGS

In the following description, features disclosed herein will be specified in greater detail by way of exemplary embodiments, with reference to the set of drawings wherein.

DETAILED DESCRIPTION

Figure 1:
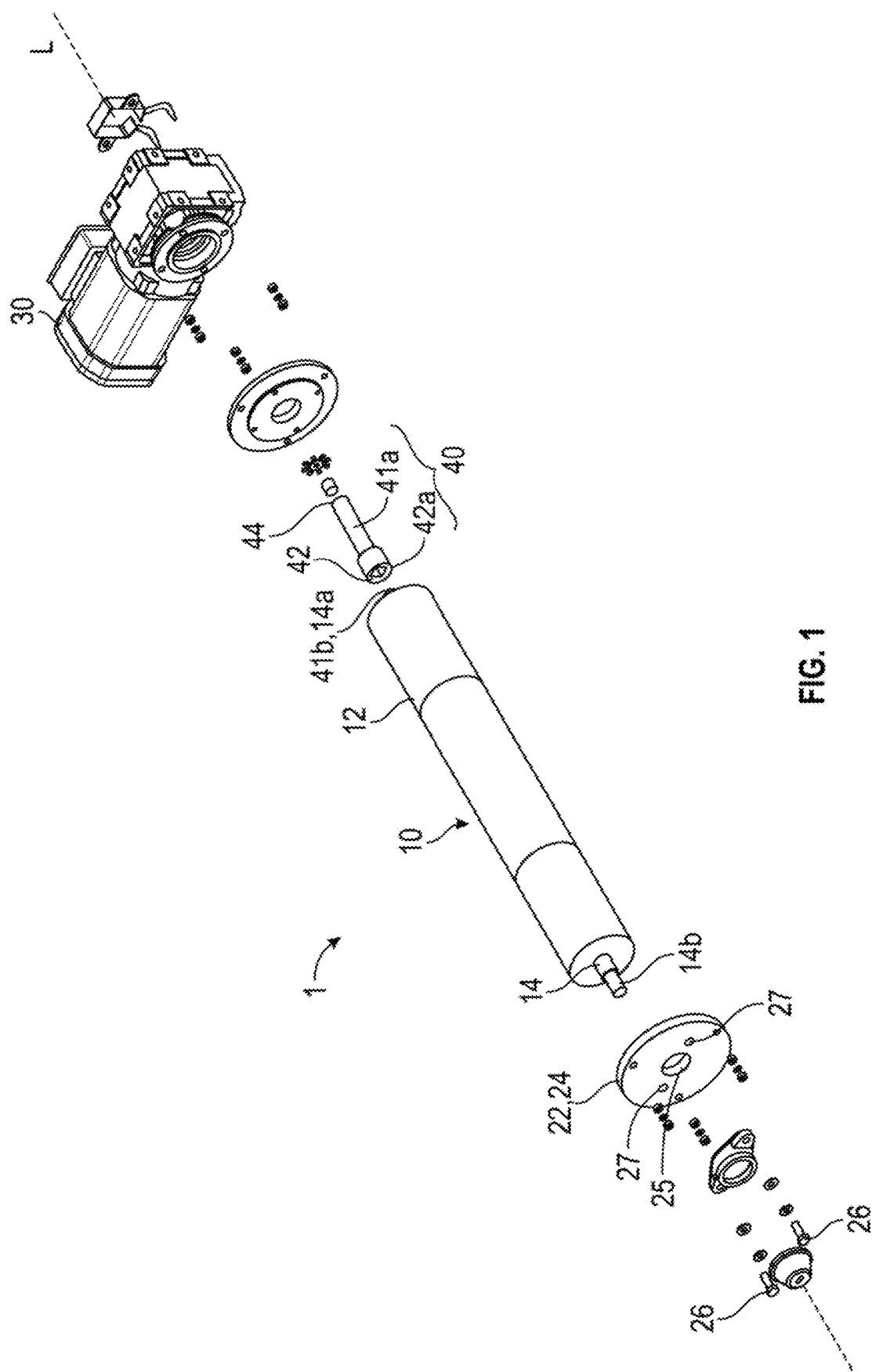
FIG. 1 is an exploded perspective view of a drive roller assembly according to an exemplary embodiment as disclosed herein.

The present disclosure discloses a drive roller assembly wherein the drive roller allows for a quick and easy release and to provide a conveyor system having said drive roller assembly.

According to exemplary embodiments of the present disclosure, an assembly includes coupling means for rotatably coupling the first axial end portion of the shaft and the drive means in an axially engaged condition of the coupling means in which the drive roller is in rotatable engagement with the drive means and for axially releasing the engagement of the first axial end portion of the shaft and the drive means in an axially disengaged condition of the coupling means, wherein the support means is adapted to be detachably attached to an attachment portion of the support structure to maintain the drive roller rotatably supported on the support structure when attached and to allow the drive roller to be removed from the support structure when detached.

By providing the coupling means that allows for axially releasing the engagement of the first axial end portion of the shaft and the drive means and by providing the support means that is detachably attached to the attachment portion of the support structure, it is possible to separate the drive roller from the support structure in a quick and easy way by detaching the support means from the attachment portion of the support structure as explained in more detail below.

Generally, the roller body of the drive roller has a cylindrical shape in exemplary embodiments. The drive roller body and the shaft are rotatably fixed with respect to each other, so that a rotation of the shaft leads to a rotation of the drive roller body. When the drive roller is driven by the drive means, an object to be conveyed by a conveyor system can be moved in a conveying direction. In the case that the conveyor system is a belt conveyor, the belt is wound around the drive roller. Then, the rotation of the drive roller leads to a movement of the belt in the conveying direction.

The drive roller is rotatably supported by the support structure of the drive roller assembly. The attachment portion of the support structure can be attachable to a conveyor support frame. However, there are also exemplary embodiments where the attachment portion of the support structure is an integral part of the conveyor support frame.

The drive means can be any motor that is suitable to apply a rotational force to the shaft of the drive roller. The drive means can be connectable to the conveyor support frame of the conveyor system.

The coupling means can be any coupling mechanism that allows for rotatably coupling the first axial end portion of the shaft and the drive means in an axially engaged condition in which a rotational force applied by the drive means can be transmitted to the first axial end portion of the shaft, thereby rotating the drive roller. The axially engaged condition of the coupling means can be obtained by moving the first axial end portion of the shaft towards the drive means in the direction of the longitudinal axis of the drive roller. By moving the first axial end portion of the shaft away from the drive means in the direction of the longitudinal axis, the axially engaged condition can be released. In this way the axially disengaged condition of the coupling means can be obtained. In the axially disengaged condition of the coupling means a rotational force of the drive means cannot be transmitted to the drive roller.

A manner for assembling and disassembling the drive roller assembly will be explained. There are two states of the drive roller, an operating state and a free state. In the operating state, the drive roller is drivable by the drive means, thereby being suitable to move an object to be conveyed by the conveyor system. In the Free State, the drive roller assembly is disassembled and the drive roller can be cleaned, repaired or replaced.

In the operating state of the drive roller, the drive roller assembly is in an assembled state. In this state, the coupling means is in its axially engaged condition. This axially engaged condition can be obtained by moving the drive roller and the drive means towards each other in the direction of the longitudinal axis. In the axially engaged condition of the coupling means the drive roller is in rotatable engagement with the drive means. Thus, a rotational force applied by the drive means can be transmitted to the drive roller. Furthermore, in the axially engaged condition the first axial end portion of the shaft of the drive roller is supported by the coupling means and the drive means. The movement of the drive roller along its longitudinal axis in the direction of the first axial end portion of the shaft is restricted. Furthermore, in the assembled state of the drive roller assembly the support means is attached to the attachment portion of the support structure. The support means is adapted to maintain the drive roller rotatably supported on the support structure when it is attached to the attachment portion of the support structure. That is, in this state the drive roller can only rotate around its longitudinal axis and cannot be moved in the direction of the longitudinal axis of the drive roller or in any direction perpendicular to the longitudinal axis. In the assembled state the drive roller is thus in its operating state in which it is drivable by the drive means and can therefore carry out its function to move an object or a belt of the conveyor system.

The drive roller can be removed from the support structure in an easy way. First, the support means is detached from the attachment portion of the support structure. Next, the drive roller is moved in the direction of its second axial end portion along its longitudinal axis, thereby releasing the engagement of the first axial end portion of the shaft and the drive means. The coupling means is then in its axially disengaged condition. This allows removing the drive roller from the support structure. The drive roller is then in its free state in which it can be brought to an arbitrary location for cleaning or maintenance, or it can be replaced by another drive roller.

In an exemplary embodiment of the present disclosure the support means can include a mounting plate adapted to receive the second axial end portion of the shaft of the drive roller. The mounting plate can include an aperture, for example a recess or an opening in which the second axial end portion can be insertable. The mounting plate can include means (e.g., a stop) to prevent the movement of the second axial end portion in the direction of the mounting plate. In this way, the mounting plate reliably maintains the drive roller in its rotatably supported position on the support structure.

In an exemplary embodiment, the mounting plate can include bearings to rotatably support the second axial end portion of the shaft of the drive roller. In this exemplary embodiment, it can be preferable that the mounting plate and the drive roller are removed together when the mounting plate is detached. This further simplifies the removal of the drive roller.

The support means can be detachably attached to the attachment portion of the support structure by a fastener element. The fastener element can be a screw or a bolt. The support structure can include a complementary threaded hole or opening to receive the screw or the bolt. The support means can be attachable to the attachment portion of the support structure via several fastener elements, for example several screws, several bolts or a combination of screws or bolts. Other known fastener elements can be used.

The coupling means can include a first coupling member rotatably connectable to the drive means and a second coupling member provided on the first axial end portion of the shaft. The first coupling member and the second coupling member can be in rotatable engagement in the axially engaged condition of the coupling means and can be axially released in the axially disengaged condition of the coupling means.

In an exemplary embodiment according to the present disclosure, the first coupling member can include a first axial end portion in the direction of its longitudinal axis, wherein the first axial end portion of the first coupling member can include a recess that is recessed in the direction of the longitudinal axis and wherein the second coupling member can be integrally provided with the first axial end portion of the shaft of the drive roller and can include a protrusion that is complementary to the recess, and the recess and the protrusion are adapted to be engaged with each other, thereby enabling rotational coupling of the first axial end portion of the shaft of the drive roller and the drive means. The first coupling member can, for example, have an elongated shape extending along its longitudinal axis, and can include the first axial end portion and a second axial end portion. The second axial end portion of the first coupling member can be rotatably connectable to the drive means. The recess that is recessed in the first axial end portion of the first coupling member in the direction of the longitudinal axis can have any shape that is suitable to enable a rotational coupling with the complementary protrusion of the second coupling member. For example, the contour of the recess can have the form of a polygon.

Alternatively, the second coupling member can be integrally provided with the first axial end portion of the shaft of the drive roller and can include a recess that is recessed in the direction of the longitudinal axis and wherein the first coupling member can include a first axial end portion in the direction of its longitudinal axis, wherein the first axial end portion of the first coupling member can include a protrusion that is complementary to the recess, and the recess and the protrusion are adapted to be engaged with each other, thereby enabling rotational coupling of the first axial end portion of the shaft of the drive roller and the drive means. As already explained, the first coupling member can have an elongated shape in its longitudinal direction and can include the first axial end portion and a second axial end portion. The second axial end portion can be rotatably connectable to the drive means. The form of the recess can have any shape that is suitable to enable a rotational coupling with the complementary protrusion. For example, the contour of the recess can have the form of a polygon.

In an exemplary embodiment of the present disclosure the first coupling member can be connectable to the drive means in a non-releasable way. This facilitates the removal of the drive roller from the support structure. Namely, when the support means is detached from the attachment portion of the support structure and the drive roller is removed, the coupling means stays fixed to the drive means and does not fall off, thereby facilitating the handling of the drive roller assembly. However, there are also exemplary embodiments in which the first coupling member is releasably connectable to the drive means.

The drive roller can be removable from the support structure by moving the drive roller in the direction of the longitudinal axis when the support means is detached from the attachment portion of the support structure. In this exemplary embodiment, the support means and the drive roller can be removed together in a very simple way by a simultaneous movement in the direction of the longitudinal axis.

Another aspect of the present disclosure relates to a conveyor system having a drive roller assembly as explained above and a conveyor belt, wherein the conveyor belt is drivable by the drive roller. The conveyor belt can be a polyurethane belt or a modular belt.

The drive roller assembly as explained herein allows for a very easy removal of the drive roller from the support structure by simply detaching the support means from the attachment portion of the support structure. This operation requires very few tools, for example only a screw driver, or it can be performed manually in case that the detachment of the support means can be performed manually.

FIG. 1 shows an exploded perspective view of an exemplary drive roller assembly 1 according to the present invention. The drive roller assembly 1 includes a drive roller 10. The drive roller 10 extends in the direction of a longitudinal axis L. The drive roller 10 includes a roller body 12 and a shaft 14. In FIG. 1 the roller body 12 has the form of a cylinder, but the roller body 12 can also include protrusions for engagement with a belt of a belt conveyor. The shaft 14 includes a first axial end portion 14a at the right axial end of the shaft 14 in FIG. 1 and a second axial end portion 14b at the left axial end of the shaft 14 in FIG. 1. The roller body 12 and the shaft 14 are rotatably fixed with respect to each other. Thus, a rotational force applied to the shaft 14 leads to the rotation of the roller body 12 around the longitudinal axis L.

The drive roller assembly 1 includes drive means 30. In the exemplary embodiment depicted in FIG. 1, the drive means 30 is a motor. The drive means 30 can create a rotational force to be transmitted to the drive roller 10.

The drive roller assembly 1 includes a coupling means 40. The coupling means 40 includes a first coupling member 41a and a second coupling member 41b. The first coupling member 41a is connectable to the drive means 30, so that a drive force of the drive means 30 leads to a rotation of the first coupling member 41a around the longitudinal axis L. The first coupling member 41a has an elongated shape in the direction of the longitudinal axis L. The first coupling member 41a includes a first axial end portion 42 facing the first axial end portion 14a of the shaft 14 and a second axial end portion 44 facing the drive means 30. At its first axial end portion 42, the first coupling member 41a includes a recess 42a that is recessed in the direction of the longitudinal axis L. The first axial end portion 14a of the shaft 14 is provided with the second coupling member 41b (see FIG. 3). In the exemplary embodiment, the second coupling member 41b is integrally provided with the first axial end portion 14a of the shaft 14 and includes a protrusion 16 (not visible in FIG. 1) which can be inserted into the recess 42a to enable a rotational engagement between the drive means 30 and the shaft 14 of the drive roller 10. This engagement will be described in further detail below.

FIG. 1 further depicts a support means 22 located at the left side in FIG. 1. The support means 22 includes a mounting plate 24. The mounting plate 24 is provided with an opening 25. The opening 25 is adapted and configured to receive the second axial end portion 14b of the shaft 14. That is, the second axial end portion 14b of the shaft 14 is insertable through the opening 25. The opening 25 can include bearings 28 (see FIG. 3) to rotatably support the second axial end portion 14b of the shaft 14. The mounting plate 24 further includes holes 27 which are adapted and configured to receive fastener elements 26. The fastener elements 26 allow to fix the mounting plate 24 to an attachment portion 21 of the support structure 20 described below. Although the mounting plate 24 is in the shape of a disc in FIG. 1, other shapes are possible for the mounting plate 24.

Figure 2:
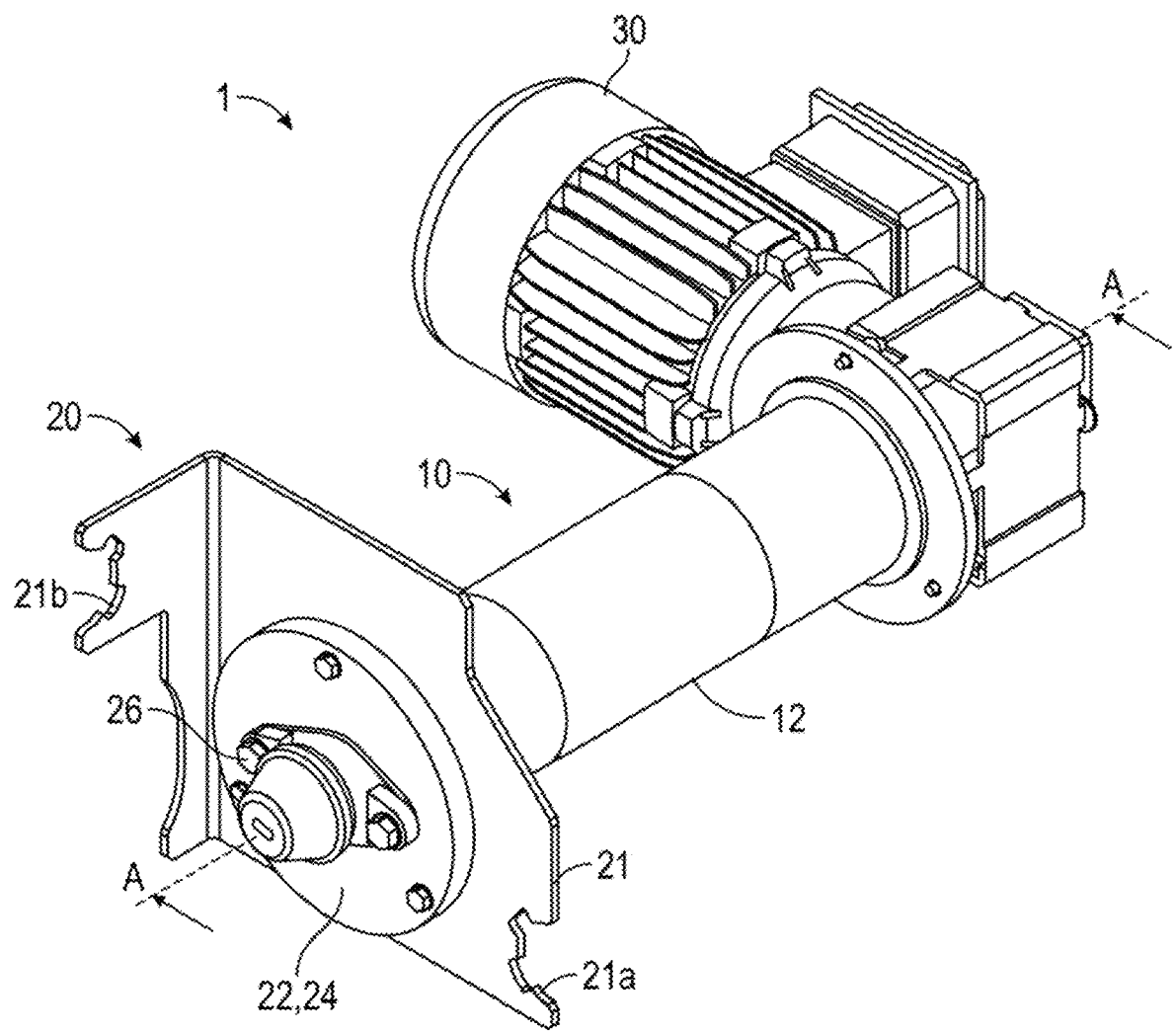
FIG. 2 is a perspective view of the exemplary drive roller assembly of FIG. 1 in its assembled state.

FIG. 2 is a perspective view of the drive roller assembly 1 shown in FIG. 1 in its assembled state. In addition to the drive roller 10, the drive means 30 and the support means 22, FIG. 2 depicts the attachment portion 21 of the support structure 20. The attachment portion 21 is fixable to a conveyor support frame 100 (not shown) by engaging recesses 21a, 21b with the conveyor support frame 100. The attachment portion 21 can be welded to the conveyor support frame 100. The mounting plate 24 is attached to the attachment portion 21 by the fastener elements 26.

Figure 3:
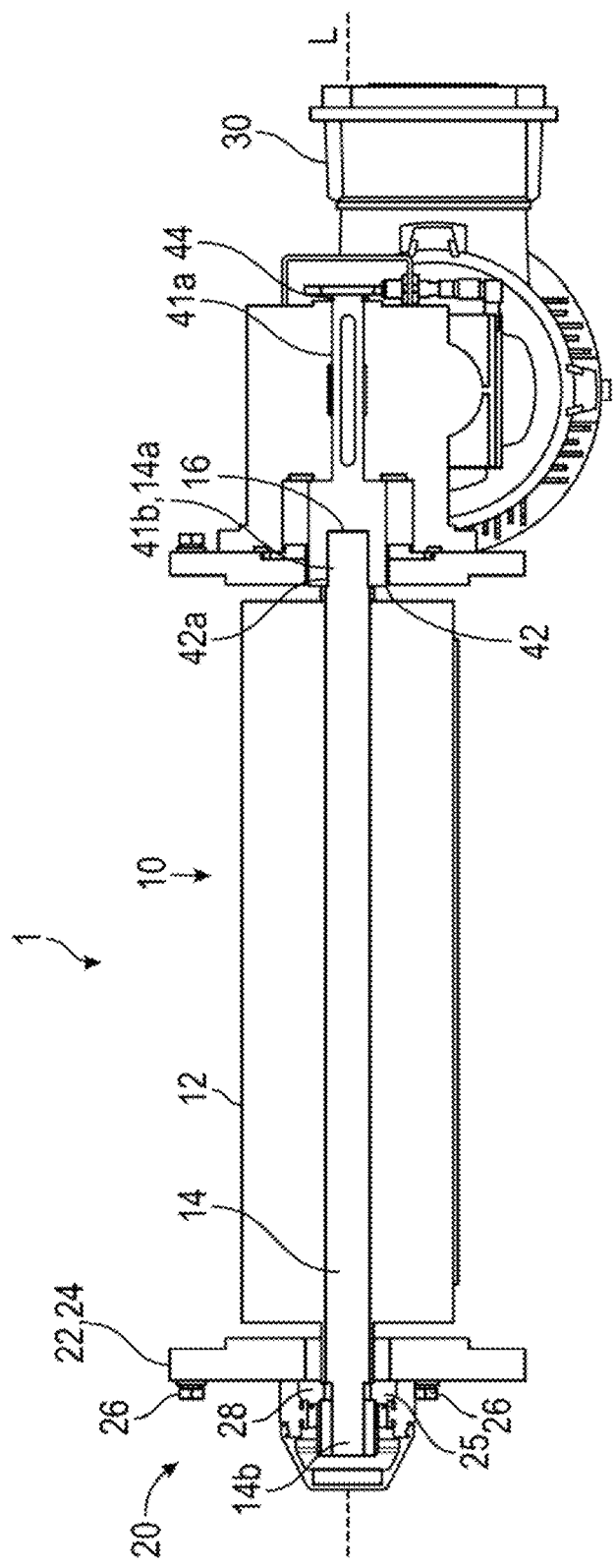
FIG. 3 is a sectional view through line A-A in FIG. 2.

FIG. 3 is a sectional view through the line A-A of the drive roller assembly 1 depicted in FIG. 2 along the direction of the arrows A. The drive roller 10 is in its assembled state. The second axial end portion 44 of the first coupling member 41a is coupled to the drive means 30 and can thus be rotated along the longitudinal axis L by a drive force applied by the drive means 30. The first axial end portion 42 of the first coupling member 41a is provided with the recess 42a. The recess 42a is recessed along the longitudinal axis L. The recess 42a is engaged with the protrusion 16 protruding from the second coupling member 41b provided on the first axial end portion 14a of the shaft 14. That is, the coupling means 40 is in its axially engaged condition in which the first axial end portion 14a of the shaft 14 and the drive means 30 are in rotatable engagement with each other. In this way, the rotational movement of the drive means can be transmitted from the first coupling member 41a to the shaft 14, thereby resulting in a rotation of the roller body 12. The axially engaged condition can be achieved by inserting the protrusion 16 into the recess 42a. Similarly, the engagement can be axially released by moving the drive roller 10 in the direction of the second axial end portion 14b of the shaft 14 (that is in the left direction in FIG. 3), thereby removing the protrusion 16 from the recess 42a.

While the coupling means 40 provides for a rotational engagement with the shaft 14, the coupling means 40 does not restrict the movement of the drive roller 10 in the direction of the longitudinal axis L towards the second axial end portion 14b. Thus, to restrict the movement of the drive roller 10 in the direction of the longitudinal axis L (towards the left side in FIG. 3), the support means 22 includes the mounting plate 24. The mounting plate 24 is attached to the attachment portion 21 of the support structure 20 not shown in FIG. 3 by the fastener elements 26. The mounting plate 24 includes the opening 25 which has bearings 28 to receive and rotatably support the second axial end portion 14b of the shaft 14. FIG. 3 thus shows the operating state of the drive roller 10.

Figure 4:
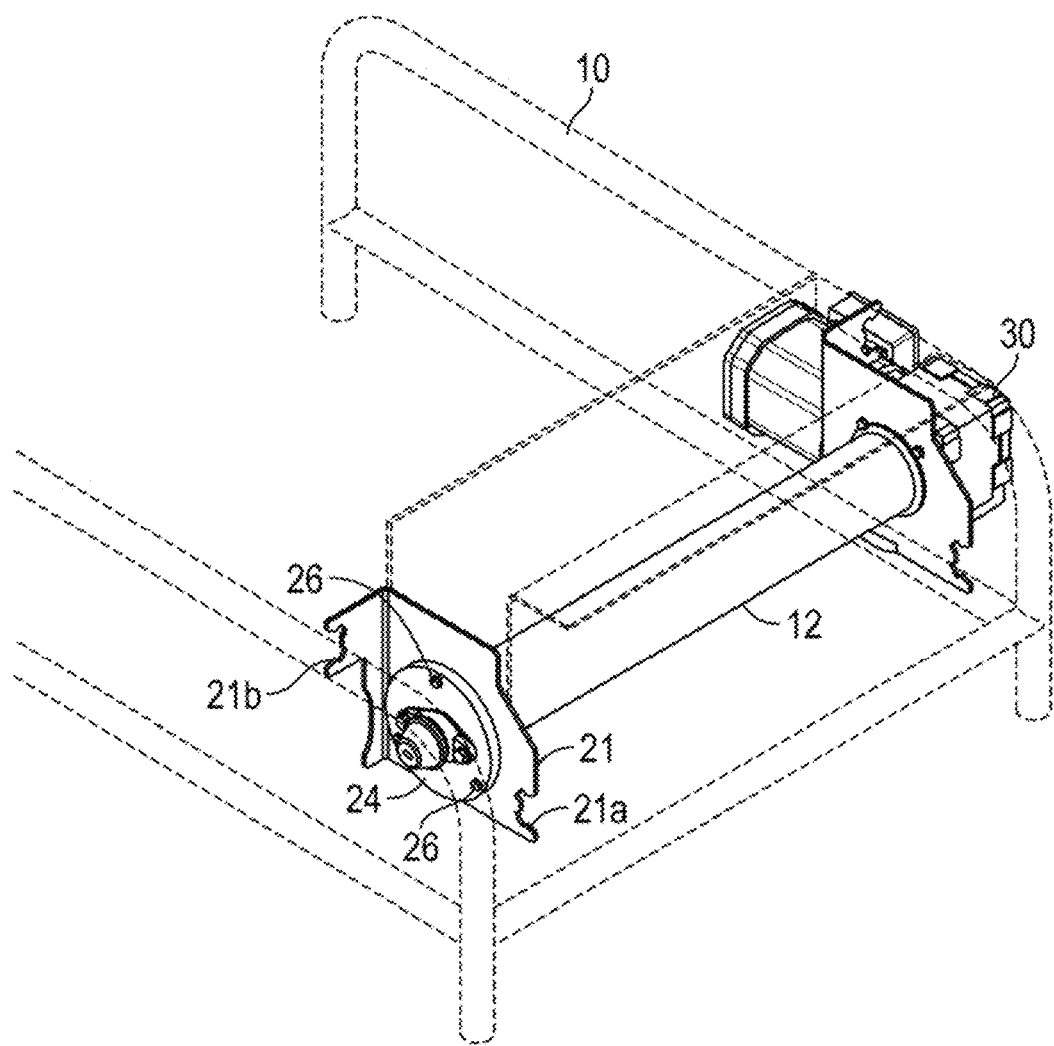
FIG. 4 is a perspective view of the exemplary drive roller assembly of FIG. 3 attached to a conveyor support frame.

FIG. 4 is a perspective view of the drive roller assembly of FIG. 3 attached to a conveyor support frame 100. The recesses 21a, 21b are in engagement with bars of the conveyor support frame 100, thereby fixing the drive roller assembly 1 to the conveyor support frame 100.

Figure 5:
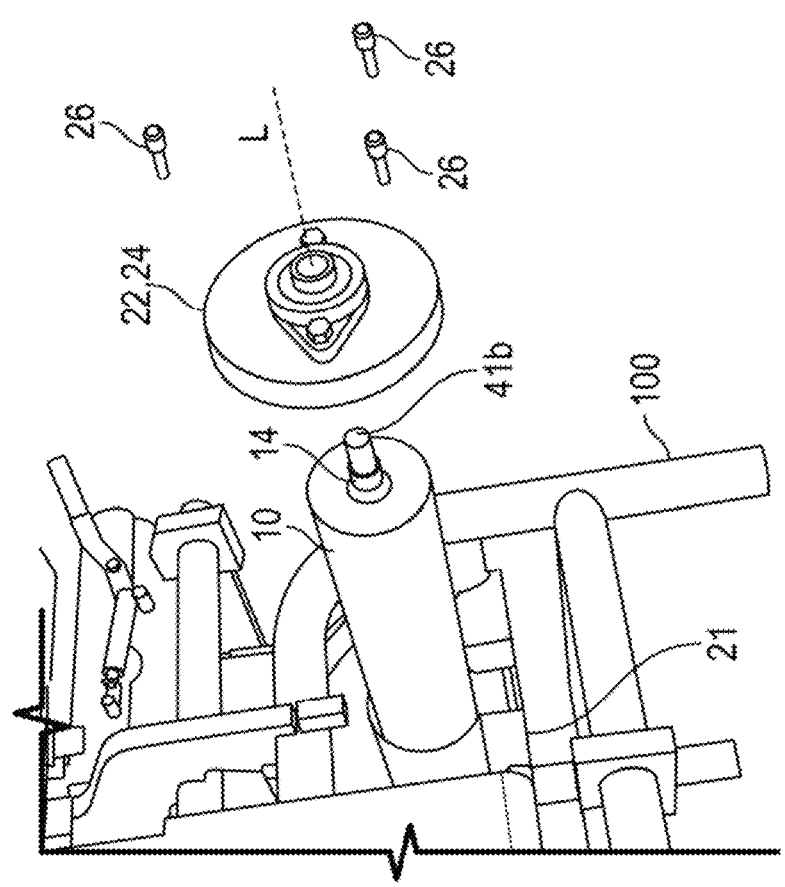
FIG. 5 is a partial perspective view of a drive roller assembly wherein the drive roller is partly removed from the support structure.

In order to remove the drive roller 10 from the drive roller assembly 1, the mounting plate 24 is detached from the attachment portion 21 of the support structure 20 as shown in FIG. 5. The mounting plate 24 can easily be detached from the attachment portion 21 of the support structure 20 by removing the fastener elements 26 from the attachment portion 21. Then, the mounting plate 24 can be detached from the attachment portion 21 by moving it in the direction of the longitudinal axis L. With reference to FIG. 3, the drive roller 10 can then be removed from the support structure 20 by pulling it in the direction of the longitudinal axis L away from the drive means 30. This is due to the fact that the coupling of the drive roller 10 to the drive means 30 is achieved via the coupling means 40 which does not restrict the movement of the shaft 14 in the direction of the second axial end portion 14b. That is, by moving the drive roller 10 away from the drive means 30, the axially engaged condition of the first coupling member 41a and the second coupling member 41b shown in FIG. 3 is released and the coupling means 40 is transferred into the axially disengaged condition. While the drive roller 10 is removable from the support structure 20 as depicted in FIG. 4 by moving it only in the direction of the longitudinal axis L, there are also examples where the drive roller 10 is removable from the support structure 20 by moving it first in the direction of the longitudinal axis L to release the axial engagement of the coupling means 40 and by then moving the drive roller 10 in a direction intersecting with the direction of the longitudinal axis L. The drive roller 10 is now released from the support structure 20 and is thus in its free state.

In order to return the drive roller 10 to its operating state, the first axial end portion 14a is coupled with the drive means 30 via the coupling means 40. This is achieved by inserting the protrusion 16 of the second coupling member 41b provided on the first axial end portion 14a of the shaft 14 into the recess 42a of the first axial end portion 42 of the first coupling member 41a. This creates rotatable engagement of the shaft 14 and the drive means 30. Furthermore, to securely fix the drive roller 10 to the support structure 20 and to prevent the drive roller 10 from unintended movement in the direction of the longitudinal axis L, the support means 22 including the mounting plate 24 is fixed to the attachment portion 21 by the fastener elements 26. In the exemplary embodiments depicted in the figures, this is achieved by inserting the second axial end portion 14b of the shaft in the opening 25 provided in the mounting plate 24 and by attaching the fastener elements 26 to the attachment portion 21 provided with the holes 27.

That is, in exemplary embodiments of the present disclosure the drive roller 10 can be removed from a conveyor support frame 100 by simply removing the support means 22, having for example a mounting plate 24, from the attachment portions 21 of the support structure 20 connected to the conveyor support frame 100. This operation can be achieved using very simple tools, for example a screw driver, or no tools at all in case that the fastener elements 26 can be handled manually.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SIGNS 1 drive roller assembly
10 drive roller
12 roller body
14 shaft
14a first axial end portion
14b second axial end portion
16 protrusion
20 support structure
21 attachment portion
21a,b recesses
22 support means
24 mounting plate
25 opening
26 fastener element
27 hole
28 bearing
30 drive means
40 coupling means
41a first coupling member
41b second coupling member
42 first axial and portion
42a recess
44 second axial end portion
L longitudinal axis
100 conveyor support frame

The invention claimed is:
1. A drive roller assembly for a conveyor system, the drive roller assembly comprising:
  a drive roller having a longitudinal axis (L), the drive roller including a roller body and a shaft, the shaft having first and second axial end portions, the drive roller being rotatable around the longitudinal axis (L);
  a support structure for rotatably supporting the drive roller, the support structure including support means for rotatably supporting the second axial end portion of the shaft;
  drive means for rotatably driving said drive roller; and
  coupling means for rotatably coupling said first axial end portion of the shaft and said drive means in an axially engaged condition of said coupling means in which said drive roller is in rotatable engagement with said drive means and for axially releasing the engagement of said first axial end portion of the shaft and the drive means in an axially disengaged condition of said coupling means, wherein:

the coupling means comprises a first coupling member rotatably connectable to said drive means and a second coupling member provided on said first axial end portion of the shaft;

said second coupling member is integrally provided with said first axial end portion of the shaft of the drive roller and comprises a recess that is recessed in a direction of the longitudinal axis (L) and wherein said first coupling member includes a first axial end portion in the direction of its longitudinal axis, wherein said first axial end portion of the first coupling member includes a protrusion that is complementary to said recess, and said recess and said protrusion are configured and adapted to be engaged with each other, thereby enabling rotational coupling of said first axial end portion of the shaft of the drive roller and said drive means;

wherein the support means is configured and adapted to be detachably attached to an attachment portion of said support structure to maintain said drive roller rotatably supported on said support structure when attached and to allow said drive roller to be removed from said support structure when detached.

2. The drive roller assembly according to claim 1, wherein the support means comprises:
a mounting plate configured and adapted to receive the second axial end portion of the shaft of the drive roller.

3. The drive roller assembly according to claim 2, wherein the mounting plate comprises:
bearings to rotatably support the second axial end portion of the shaft of the drive roller.

4. The drive roller assembly according to claim 1, comprising:
a fastener element for detachably attaching the support means to said attachment portion of the support structure.

5. The drive roller assembly according to claim 1, wherein the first coupling member is configured to be connectable to the drive means in a non-releasable way.

6. The drive roller assembly according to claim 1, wherein the drive roller is configured to be removable from said support structure by moving the drive roller in a direction of the longitudinal axis (L) when the support means is detached from the support structure.

7. The drive roller assembly according to claim 3, comprising:
a fastener element for detachably attaching the support means to said attachment portion of the support structure.

8. A conveyor system, comprising:
a drive roller having a longitudinal axis (L), the drive roller including a roller body and a shaft, the shaft having first and second axial end portions, the drive roller being rotatable around the longitudinal axis (L);

a support structure for rotatably supporting the drive roller, the support structure including support means for rotatably supporting the second axial end portion of the shaft;

drive means for rotatably driving said drive roller;

coupling means for rotatably coupling said first axial end portion of the shaft and said drive means in an axially engaged condition of said coupling means in which said drive roller is in rotatable engagement with said drive means and for axially releasing the engagement of said first axial end portion of the shaft and the drive means in an axially disengaged condition of said coupling means, wherein:

the coupling means comprises a first coupling member rotatably connectable to said drive means and a second coupling member provided on said first axial end portion of the shaft;

said second coupling member is integrally provided with said first axial end portion of the shaft of the drive roller and comprises a recess that is recessed in a direction of the longitudinal axis (L) and wherein said first coupling member includes a first axial end portion in the direction of its longitudinal axis, wherein said first axial end portion of the first coupling member includes a protrusion that is complementary to said recess, and said recess and said protrusion are configured and adapted to be engaged with each other, thereby enabling rotational coupling of said first axial end portion of the shaft of the drive roller and said drive means;

wherein the support means is configured and adapted to be detachably attached to an attachment portion of said support structure to maintain said drive roller rotatably supported on said support structure when attached and to allow said drive roller to be removed from said support structure when detached; and a conveyor belt, wherein the conveyor belt is arranged to be drivable by the drive roller.

9. The conveyor system according to claim 8, wherein the conveyor belt is a polyurethane belt or a modular belt.

* * * * *